(12) United States Patent
Isshiki

(10) Patent No.: US 8,582,170 B2
(45) Date of Patent: Nov. 12, 2013

(54) IMAGE FORMING APPARATUS, PRINT CONTROL METHOD, AND STORAGE MEDIUM FOR CONTROLLING USER OF EXECUTING GRAY-OUT PRINT SETTINGS

(75) Inventor: Naohiro Isshiki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 13/164,644

(22) Filed: Jun. 20, 2011

(65) Prior Publication Data

US 2011/0317176 A1    Dec. 29, 2011

(30) Foreign Application Priority Data

Jun. 25, 2010 (JP) ................................. 2010-145117

(51) Int. Cl.
G06K 15/02  (2006.01)

(52) U.S. Cl.
USPC .......................... 358/1.2; 358/1.15; 358/1.18

(58) Field of Classification Search
USPC ........................................ 358/1.2, 1.15, 1.18
See application file for complete search history.

(56) References Cited

U.S. PATENT DOCUMENTS

| | | | | |
|---|---|---|---|---|
| 6,134,019 A * | 10/2000 | Wantuck et al. | ............... | 358/1.15 |
| 6,985,245 B1 * | 1/2006 | Takahashi | .................... | 358/1.15 |
| 7,394,562 B2 * | 7/2008 | Nakagiri et al. | ............. | 358/1.18 |
| 2003/0011802 A1 * | 1/2003 | Nakagiri et al. | ............. | 358/1.13 |
| 2003/0056177 A1 * | 3/2003 | Nara et al. | ..................... | 715/525 |
| 2003/0137691 A1 * | 7/2003 | Tanaka | ......................... | 358/1.15 |
| 2004/0004731 A1 * | 1/2004 | Itagaki | ........................... | 358/1.9 |
| 2004/0130744 A1 * | 7/2004 | Wu et al. | ...................... | 358/1.15 |
| 2006/0023243 A1 * | 2/2006 | Asai | ............................. | 358/1.13 |
| 2006/0158706 A1 * | 7/2006 | Mori et al. | ...................... | 358/540 |
| 2007/0201071 A1 * | 8/2007 | Yamada et al. | ............... | 358/1.13 |
| 2007/0279673 A1 * | 12/2007 | Utsunomiya | ................ | 358/1.14 |
| 2009/0116052 A1 * | 5/2009 | Matsuzawa | .................. | 358/1.14 |

FOREIGN PATENT DOCUMENTS

JP    11-134125 A    5/1999

* cited by examiner

*Primary Examiner* — Benny Q Tieu
*Assistant Examiner* — Quyen V Ngo
(74) *Attorney, Agent, or Firm* — Canon USA, Inc., IP Division

(57) ABSTRACT

An image forming apparatus may include an acquisition unit, a setting unit, and an instruction unit. The acquisition unit acquires print data from an information processing apparatus. The setting unit receives a user operation executed via an input device and configured to execute a print setting for the print data. The instruction unit instructs the acquisition unit to acquire the print data based on a print instruction for executing printing and instructs the setting unit to receive an input by the user operation for executing a print setting for the print data.

4 Claims, 17 Drawing Sheets

FIG. 1A

| | A | B | C | D | D |
|---|---|---|---|---|---|
| 1 | | INVOICE | | | |
| 2 | | DESCRIPTION OF ARTICLES | QUANTITY | UNIT PRICE (YEN) | SUBTOTAL (YEN) |
| 3 | | NOTEBOOK | 10 | 120 | 1200 |
| 4 | | PENCIL | 100 | 45 | 4500 |

FIG. 7

| ADDRESS | TYPE OF PROCESSING |
|---|---|
| www.xxx.hyou/* | PULL PRINTING |
| www.yyy.doc/* | PULL PRINTING |
| www.zzz.file/*.pdf | PREVIEW |
| www.zzz.file/*.jpg | STORAGE IN BOX |
| ⋮ | ⋮ |
| * | SELECT |

IMAGE FORMING APPARATUS, PRINT CONTROL METHOD, AND STORAGE MEDIUM FOR CONTROLLING USER OF EXECUTING GRAY-OUT PRINT SETTINGS

BACKGROUND OF THE INVENTION

1. Field of the Invention

The present invention relates to an image forming apparatus capable of communicating with an information processing apparatus.

2. Description of the Related Art

In recent years, a broadband network environment and a virtualized server have been widely used. In other words, the Internet infrastructure has greatly progressed. Under such circumstance of the greatly progressed Internet infrastructure, use of the following network communication has been widespread. More specifically, more and more users may access an office application, which operates on a server on the Internet, via a web browser.

The office application includes document generation software, spreadsheet software, and presentation software. The application operating on an Internet server and accessed by a user via a web browser is referred to as a Software as a Service (SaaS) application, a cloud application, or a web application.

On the other hand, more and more multifunction peripherals (MFPs) used in an office have been used in a network-connected environment. Japanese Patent Application Laid-Open No. 11-134125 discusses an MFP that enables a user to access resources on the Internet via a web browser (a local user interface (UI)) operating on the MFP.

A recently developed MFP enables a user to access a cloud application via a web browser on a local UI. In addition, the MFP like this can print a document that has been generated or stored by the cloud application. However, it is desired by the market that time required for printing a document generated or stored by a cloud application on an MFP be reduced in addition to enabling printing of the document generated or stored by the cloud application.

SUMMARY OF THE INVENTION

The present invention is directed to a method for improving the productivity of an image forming apparatus that processes and handles print data stored on an information processing apparatus.

According to an aspect of the present invention, an image forming apparatus includes an acquisition unit configured to acquire print data from an information processing apparatus, a setting unit configured to receive a user operation executed via an input device and configured to execute a print setting for the print data, and an instruction unit configured to instruct the acquisition unit to acquire the print data based on a print instruction for executing printing and configured to instruct the setting unit to receive an input by the user operation for executing a print setting for the print data.

According to another aspect of the present invention, an image forming apparatus including a plurality of functions for processing print data, the image forming apparatus includes an acquisition unit configured to acquire print data from an information processing apparatus, a selection unit configured to determine whether print data is to be acquired by the acquisition unit and if it is determined that the print data is to be acquired by the acquisition unit, configured to select predetermined processing for executing the function for processing the print data from among processing for executing each of the plurality of functions.

According to yet another aspect of the present invention, an image forming apparatus includes a detection unit configured to detect data that includes an instruction for displaying a screen for receiving a setting of a print item used in generating print data on an information processing apparatus, a setting unit configured to determine whether the data has been detected by the detection unit, if it is determined that the data has been detected, configured to generate a print setting screen for receiving a setting of another print item different from the print item together with the print item, and configured to execute a print setting via the print setting screen, a request unit configured to transmit setting information set to the print item via the print setting screen, to the information processing apparatus and configured to request the information processing apparatus to generate print data, a print unit configured, when a reply describing that print data has been generated based on the setting information set to the print item is received from the information processing apparatus, to acquire the print data from the information processing apparatus and configured to print the print data according to the setting information set to the print item and to another print item via the print setting screen.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 1A through 1D illustrate an example of a screen used in an assumed print method.

FIG. 7 illustrates an exemplary configuration of a table.

DESCRIPTION OF THE EMBODIMENTS

Various exemplary embodiments, features, and aspects of the invention will be described in detail below with reference to the drawings.

Figure 1B:
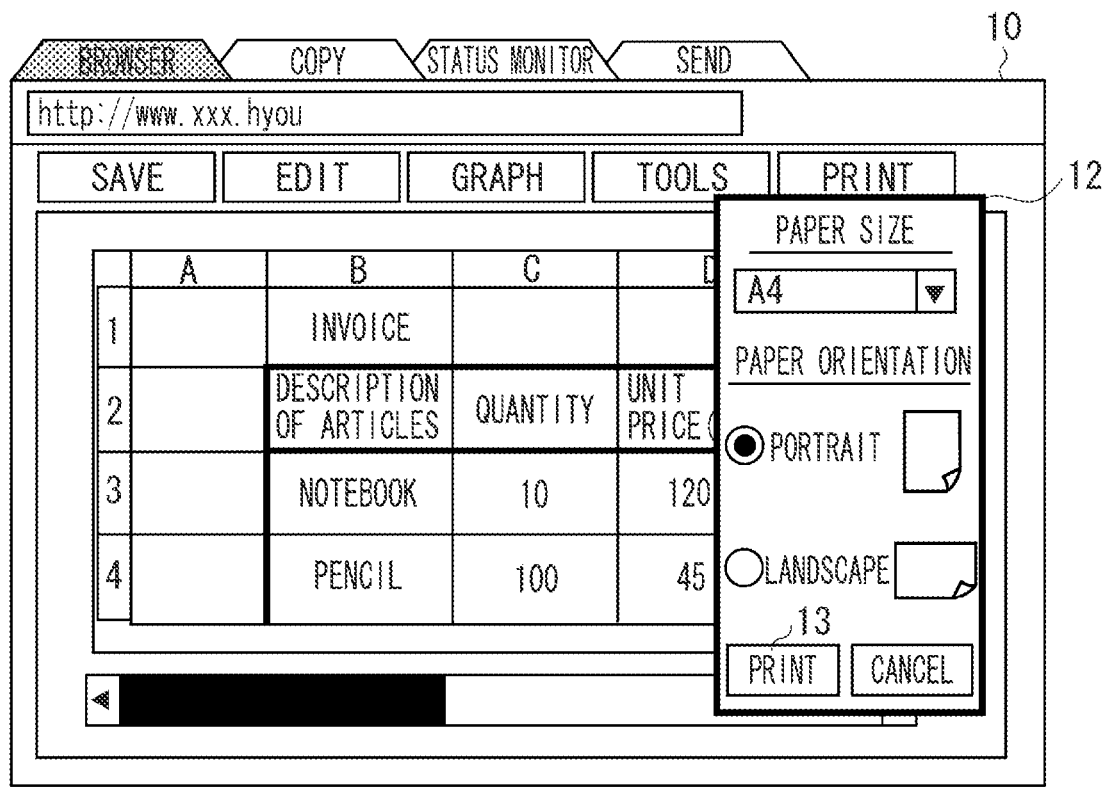

To begin with, a print method according to an exemplary embodiment of the present invention, which is executed by an image forming apparatus to print data by utilizing a web application, will be described in detail below. FIGS. 1A through 1D illustrate an example of a screen used in the assumed print method. Referring to FIG. 1A, a web browser screen 10 is displayed on an image forming apparatus by utilizing a web application, which has a spreadsheet function.

In the embodiments, it is supposed that a user can generate a table, a graph, or a general document via a screen that can enable various functions of the web application. The document generated by the user is stored on a web server that provides the web application. Furthermore, the user can print the generated document by selecting a print button 11, which is provided on the web browser screen 10. When the print button 11 is selected, a popup screen 12 (FIG. 1B) is displayed. The popup screen 12 is a screen of the web application for executing a print setting.

More specifically, via the popup screen 12, the user executes a print setting for an input item (i.e., a print item, such as paper size or paper orientation) necessary to generate PDF data, which is an example of print data used in printing. Subsequently, when a print button 13 is selected via the popup screen 12, the web server generates PDF data used in printing.

In this case, for example, the image forming apparatus acquires the generated PDF data, executes layout processing thereon, and then prints the processed image data (i.e., executes pull-printing).

Figure 1C:
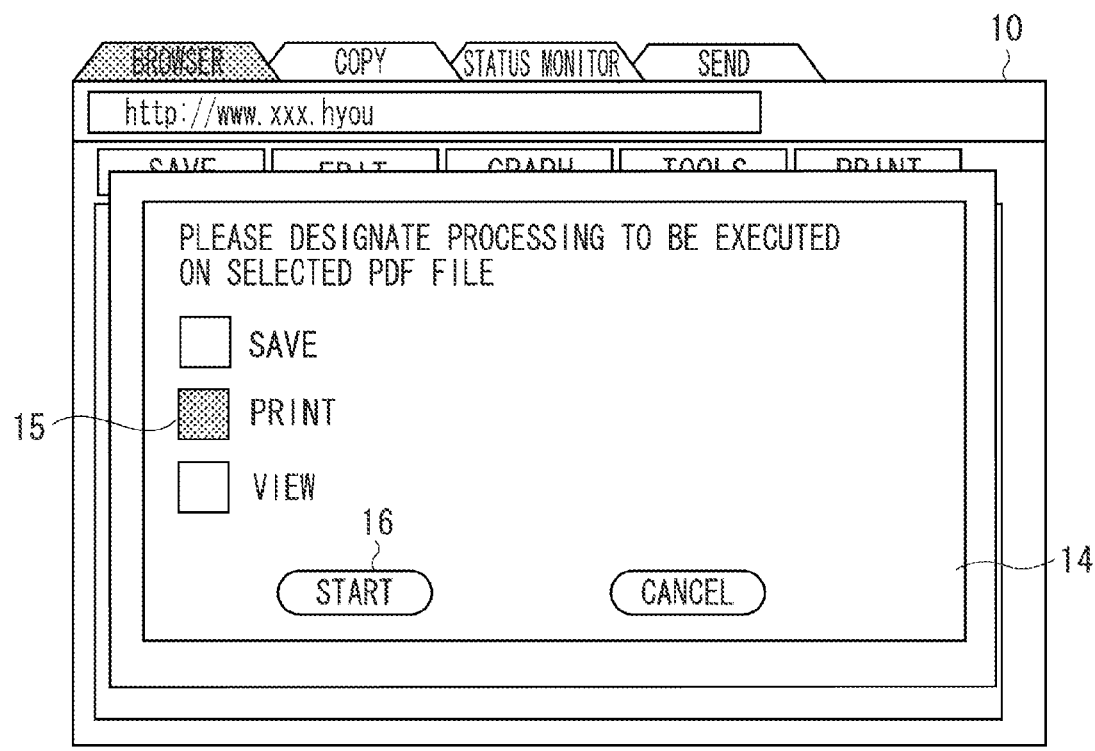

In the present exemplary embodiment, in executing the pull-printing, the image forming apparatus displays a selection popup screen 14 on the web browser (local UI) as illustrated in FIG. 1C. The user can select a method for processing the PDF data via the selection popup screen 14. More specifically, the user can select box storage, printing, or preview (display) via the selection popup screen 14.

Figure 1D:
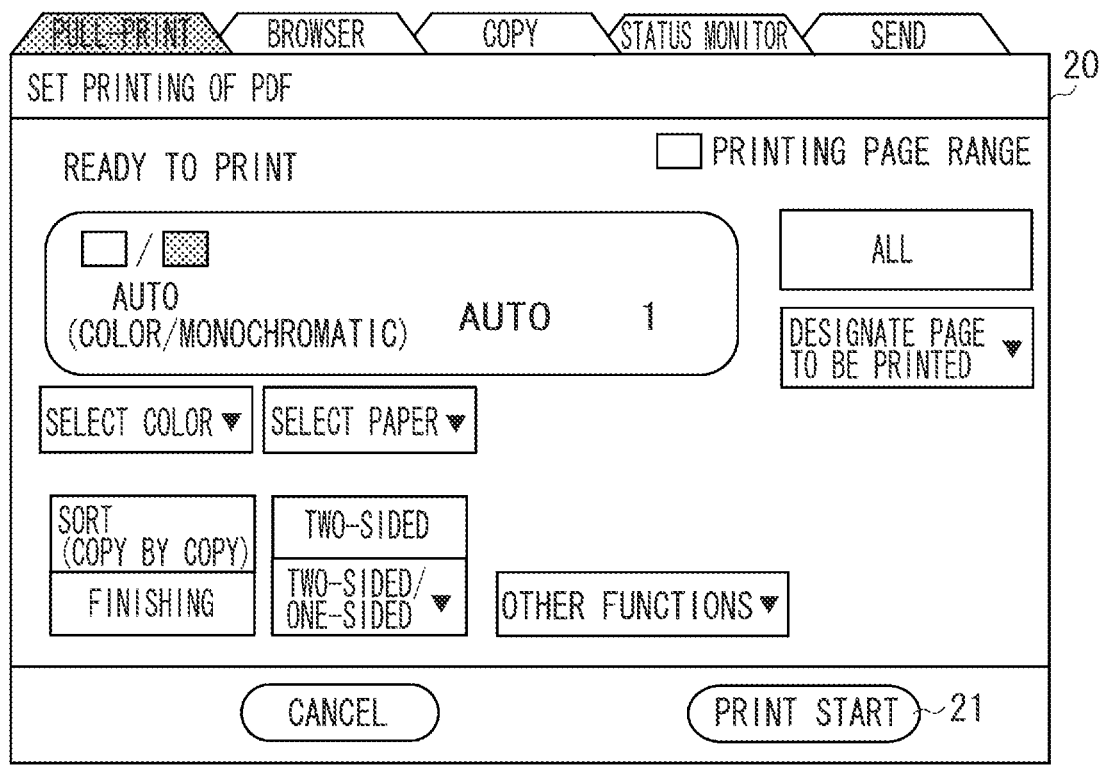

For example, in executing printing, the user selects a print button 15 via the local UI, and then selects a start button 16. If it is determined by the image forming apparatus that the user has pressed the start button 16, then the image forming apparatus downloads the PDF data from the web server and displays a print setting screen 20 for pull-printing (FIG. 1D).

Subsequently, the user executes detailed print settings related to print items, such as a two-sided setting or a setting for a finisher via the print setting screen 20. Then the user can select a print start button 21. In addition, the image forming apparatus prints the downloaded PDF data on the sheet according to a content (the print setting information) set to each item. However, the following problem may arise in the above-described assumed print method.

(1) Because the setting (instruction) executed via the print setting screen 20 of the local UI is received after the PDF data has been downloaded, the user is required to wait until the PDF data is completely downloaded. Therefore, if the PDF data is large, the productivity may degrade.

(2) The user is required to execute the redundant designation via the print setting screen 20 even when the user has already executed another designation via the popup screen 12 by selecting the print button 11 on the web browser screen 10.

(3) The user is required to execute the redundant print instruction via the selection popup screen 14 even when the user has already executed another instruction via the popup screen 12 by selecting the print button 11 on the web browser screen 10.

Figure 2:
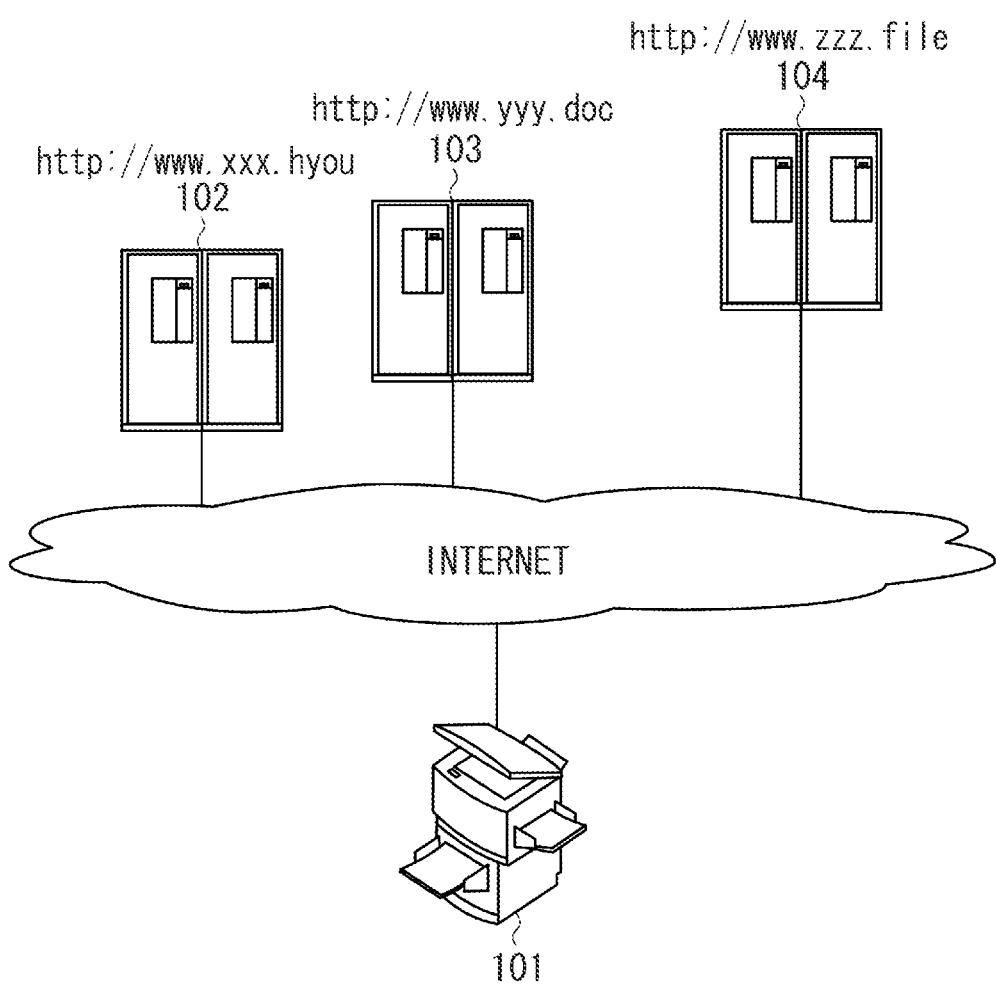
FIG. 2 illustrates an example of a system.

In the following description, an example of an image forming apparatus (computer) according to an exemplary embodiment, which is capable of solving each of the above-described problems (1) through (3), will be described in detail below. FIG. 2 illustrates an example of a system according to the present exemplary embodiment. Referring to FIG. 2, the system includes the image forming apparatus 101 and a plurality of web servers (application servers 102 and 103 and a file server 104).

The image forming apparatus 101 is connected to the Internet (network) and accesses various web servers on the Internet. The application server 102, which is an example of the information processing apparatus, provides a spreadsheet application via the Internet. The user can access the application server 102 by a uniform resource locator (URL) "http://www.xxx.hyou".

The application server 103, which is an example of the information processing apparatus, provides a document generation application via the Internet. The user can access the application server 103 by the URL "http://www.yyy.doc".

The file server 104, which is an example of the information processing apparatus, provides a file management application that enables storage and viewing of various files via the Internet. The user can access the file server 104 by the URL "http://www.zzz.file".

Figure 3:
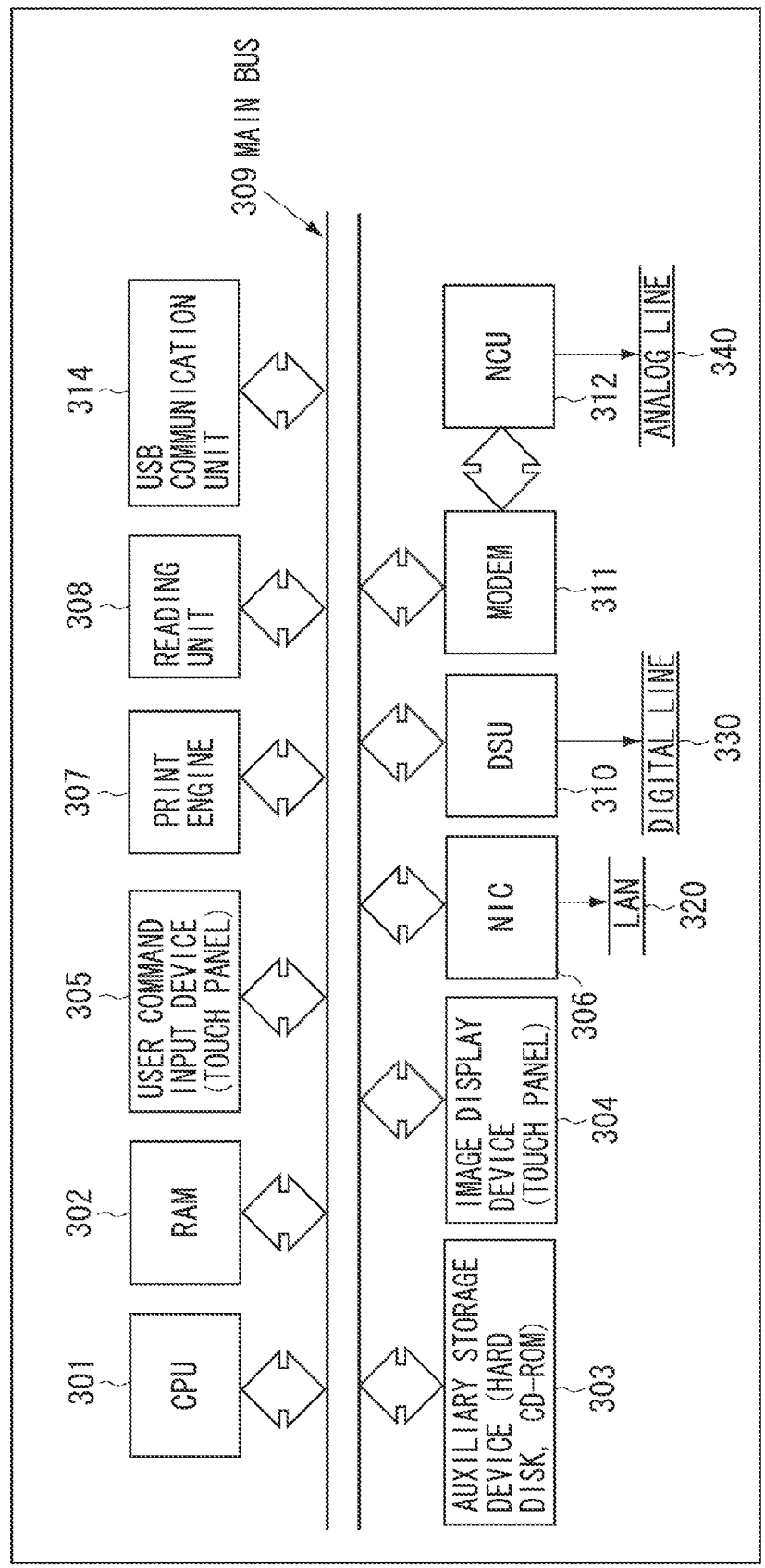
FIG. 3 illustrates an exemplary hardware configuration of an image forming apparatus.

FIG. 3 illustrates an exemplary hardware configuration of the image forming apparatus 101. Referring to FIG. 3, a central processing unit (CPU) 301 centrally controls the operation of the image forming apparatus 101. A random access memory (RAM) 302 provides a work area of the CPU 301 and temporarily stores data.

An auxiliary storage device 303 is a removable memory, such as a hard disk or a compact disc-read only memory (CD-ROM) and stores the data. The auxiliary storage device 303 can be used instead of the RAM 302. The image display apparatus 304 is an example of an input device, such as a touch panel. The image display apparatus 304 displays the status of a print engine 307 or an error message. In addition, for example, the image display apparatus 304 receives a print setting in response to a user operation.

A user command input device 305 is an example of an input device, such as a touch panel. The user command input device 305 receives an input of login information in response to a user operation.

A network interface card (NIC) 306 executes two-way data communication with other apparatuses on the network via a local area network (LAN) 320. In the present exemplary embodiment, the LAN 320 is connected to the Internet via a router (not illustrated). Accordingly, the image forming apparatus 101 can communicate with the application server 102, the application server 103, and the file server 104.

The print engine 307 outputs (prints) the print data that has been input (or acquired) via the network onto a sheet. The reading unit 308 is a scanner, which reads an image of a printed document set on a document stand to generate electronic data, such as monochromatic (binary) data or color (multivalued) data.

A digital service unit (DSU) (digital line terminal apparatus) 310 is connected to a digital line 330 and transmits and receives data between the image forming apparatus 101 and an external apparatus. A modem 311 modulates or demodulates the data transmitted or received via a network control unit (NCU) 312.

The NCU 312 is connected to an analog line 340. The NCU 312 opens and closes the line, controls an outgoing or incoming call, and transmits and receives image data (analog image data). A universal serial bus (USB) communication unit 314 transmits and receives data to and from an external information terminal by using the USB. Basically, the above-described module units are in communication with one another via a main bus 309.

The present exemplary embodiment is not limited to the above-described configuration. More specifically, the image display apparatus 304 and the user command input device 305 can be implemented on the same module. Furthermore, it is not always required to provide the reading unit 308, the DSU 310, the modem 311, or the NCU 312.

In the present exemplary embodiment, each function of the image forming apparatus 101 and each processing executed by the image forming apparatus 101 according to the following flow charts are implemented by the CPU 301 by executing processing according to instructions included in a program stored on the RAM 302.

Figure 4:
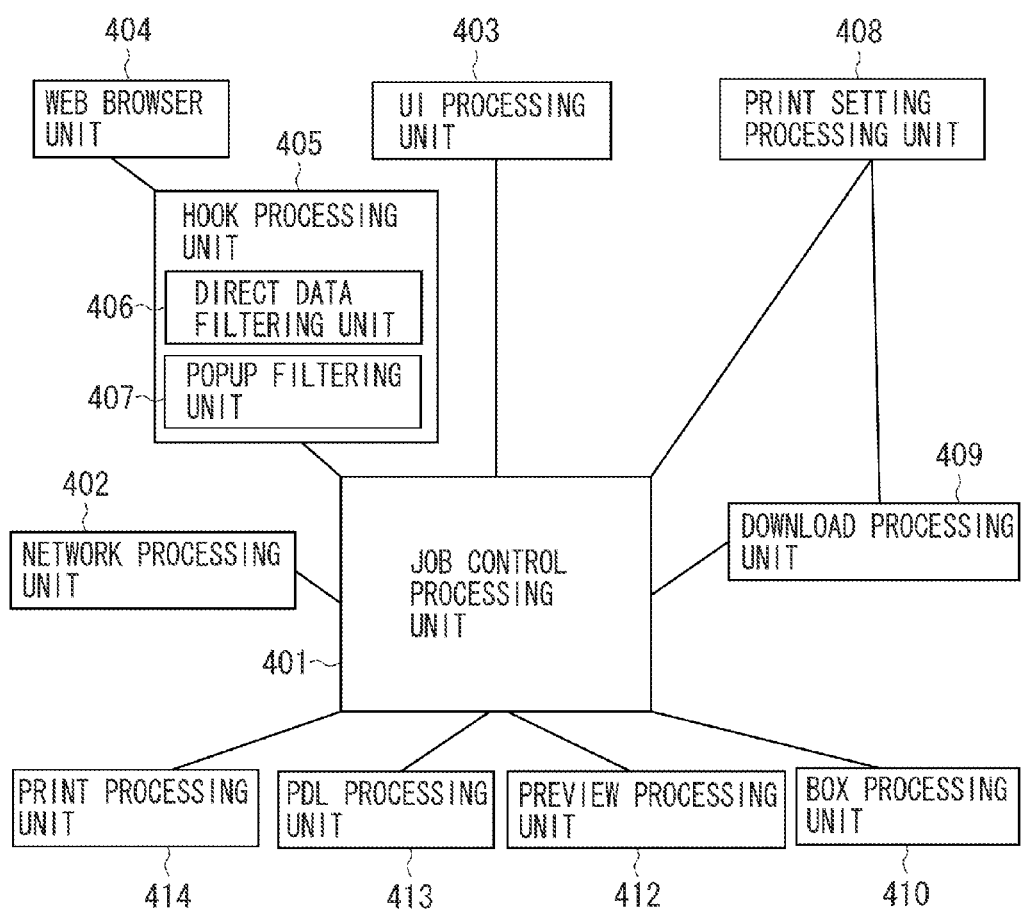
FIG. 4 illustrates an exemplary functional configuration of the image forming apparatus.

FIG. 4 illustrates an exemplary functional configuration of the image forming apparatus 101. Referring to FIG. 4, the job control processing unit 401 centrally controls each software module. More specifically, the job control processing unit 401 controls each job input to and processed by the image forming apparatus 101.

A network processing unit 402 is software module that controls an external communication, which is primarily executed via the NIC 306. In other words, the network processing unit 402 controls communications with other apparatuses on the network. In addition, when a control command or data is received from a network apparatus, the network processing unit 402 notifies the content of the received command or data to the job control processing unit 401.

Furthermore, the network processing unit 402 transmits the control command and the data to each apparatus on the network according to an instruction input by the job control processing unit 401. A UI processing unit 403 is software module that primarily controls the image display apparatus 304 and the user command input device 305. The UI processing unit 403 notifies the content of a user operation executed via the image display apparatus 304 or the user command input device 305 to the job control processing unit 401. In addition, the UI processing unit 403 controls the content of display by the image display apparatus 304 or the user command input device 305 according to a result of processing by the job control processing unit 401.

The web browser 404 is software module that executes communication with the web server connected to the network, such as the application server 102, via the network processing unit 402. The web browser 404 displays a web browser screen on the image display apparatus 304 based on the resource acquired from the web server. Furthermore, the web browser 404 controls the web browser screen in response to a user operation executed via the image display apparatus 304.

A hook processing unit 405 is software module that executes filtering on data transmitted and received between the web browser 404 and the web browser screen where necessary. More specifically, the hook processing unit 405 includes software filters, such as the direct data filtering unit 406 and the popup filter unit 407.

The direct data filtering unit 406 monitors a GET command (GET method) transmitted from the web browser 404 to the web server. More specifically, the direct data filtering unit 406 detects a command (a GET command) for acquiring a directly processable file. In the present exemplary embodiment, a "directly processable file" refers to a file that can be directly processed by the image forming apparatus 101. The directly processable file includes a PDF file, an eXtended Markup Language (XML) paper specification (XPS) file, a Joint Photographic Experts Group (JPEG) file, and a tagged image file format (TIFF) file.

If a GET command has been detected, the direct data filtering unit 406 notifies the job control processing unit 401 that the GET command has been instructed together with the uniform resource identifier (URI) of the directly processable file. The direct data filtering unit 406 executes the determination as to whether a directly processable file has been received by utilizing the prefix of the input file. The directly processable file is not limited to a PDF file, an XPS file, a JPEG file, or a TIFF file. More specifically, a file of a format other than PDF, XPS, JPEG, or TIFF can be used. The popup filter unit 407 is a software filter provided to each web server connected via the network. The popup filter unit 407 monitors data input to and output from the web browser 404.

If data that instructs the display (output) of the popup screen (display instruction data) is detected, the popup filter unit 407 notifies the job control processing unit 401 that the display instruction data has been detected and an input item on the popup screen. In addition, when the notification from the job control processing unit 401 is received, the popup filter unit 407 executes processing for closing the popup screen and transmits a reply to the web server. The web server previously stores rules applied to the popup filter unit 407 for detecting the display instruction data (keywords included in the communication as its content and the order of the keywords).

A print setting processing unit 408 is software module which controls a pull-printing screen for executing various print settings (i.e., the print setting processing unit 408 executes input control) when pull-printing is executed after receiving a notification from the job control processing unit 401 and a download processing unit 409. The download processing unit 409 is software module which executes processing for downloading a directly processable file. In other words, the download processing unit 409 can acquire a directly processable file from the web server.

In downloading a data file, the download processing unit 409 controls the order of acquiring (inputting) data while analyzing the data according to a type of the data. In addition, the download processing unit 409 notifies a part of the content (result) of the analysis to the print setting processing unit 408.

A BOX processing unit 410 is software module which registers various data notified from the network processing unit 402 and scan image data generated by the image forming apparatus 101 to a file system, which is structured on the auxiliary storage device 303 (i.e., the BOX processing unit 410 executes file-system registration). A preview processing unit 412 is a software module which generates a preview image of the file registered by the BOX processing unit 410 and the file downloaded by the download processing unit 409. In addition, the preview processing unit 412 executes control for displaying the generated preview image on the image display apparatus 304 via the UI processing unit 403.

A PDL processing unit 413 is software module configured to analyze PDL data according to an instruction input by the job control processing unit 401. In addition, the PDL processing unit 413 executes drawing based on the result of the analysis. Furthermore, the PDL processing unit 413 notifies the generated image to the job control processing unit 401. The PDL processing unit 413 can execute analysis and drawing on a plurality of types of PDL data.

A print processing unit 414 is software module configured to control the print engine 307 according to an instruction input by the job control processing unit 401 and to print a designated image (i.e., to execute print processing). Furthermore, the print processing unit 414 receives image data and various information, such as image information (information about an image such as the size of the image data, the color mode, or the resolution), layout information (information such as offset layout information, scaling, or imposition), or output sheet information (the size and the printing direction). In addition, the print processing unit 414 executes appropriate image processing on the image data and prints the image data on the designated sheet by controlling the print engine 307.

First Example of Processing by the Web Application

Figure 5A:
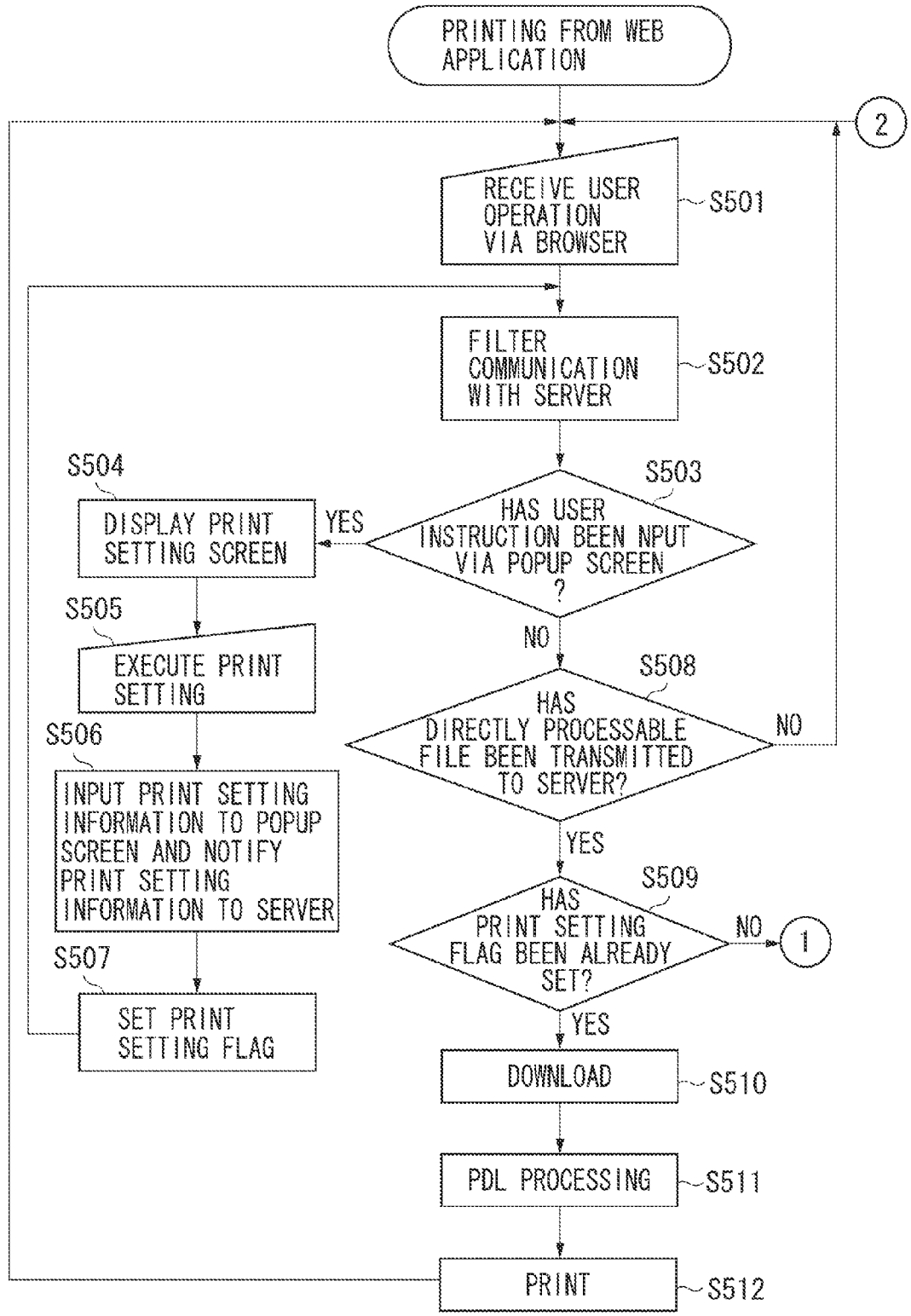
FIGS. 5A and 5B is a flowchart illustrating exemplary processing executed by a print control processing program.
Figure 5B:
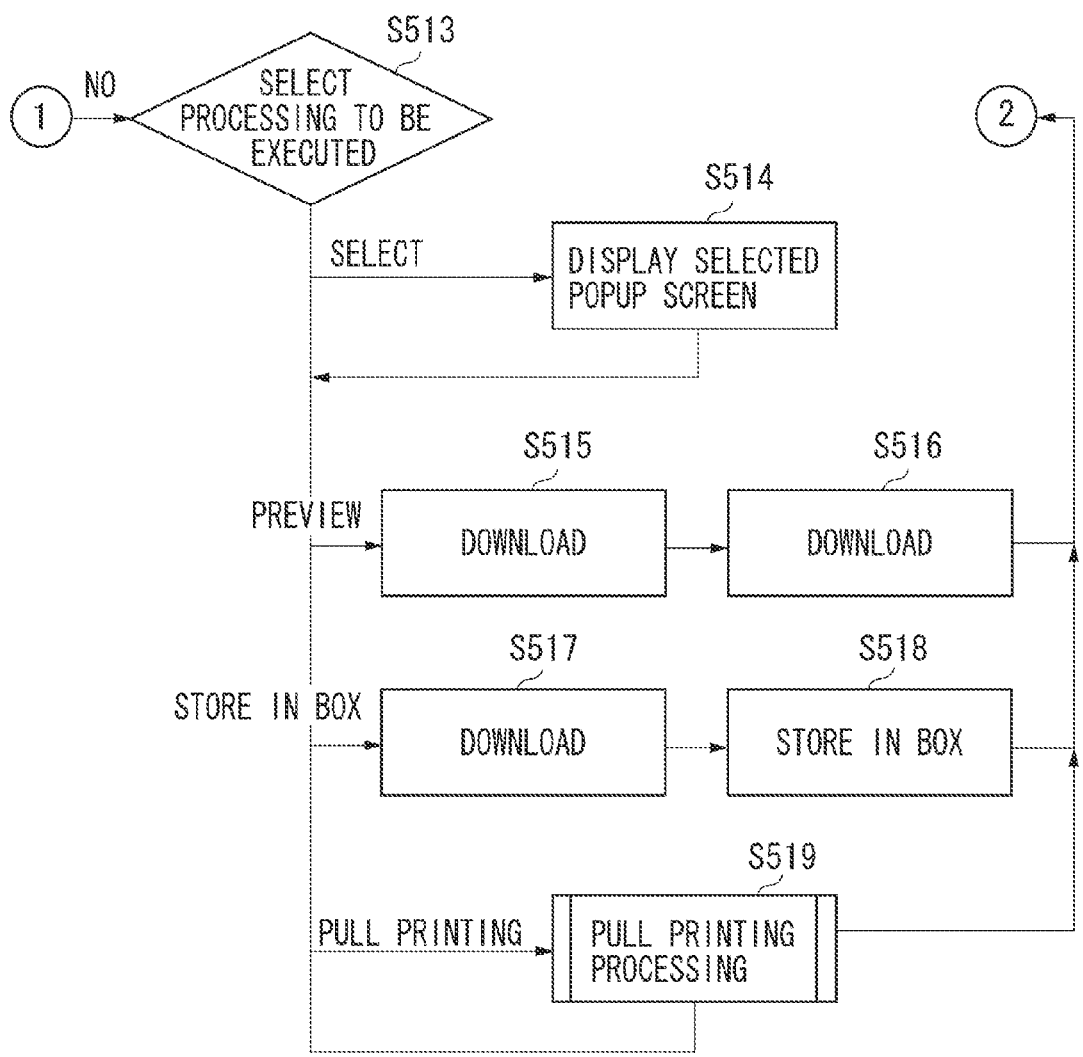

Now, print control processing according to the present exemplary embodiment, which is print processing executed by the image forming apparatus 101 by accessing the application server 102 according to a user operation executed via the image display apparatus 304, will be described in detail below with reference to the flow chart of FIGS. 5A and 5B. FIGS. 5A and 5B is a flow chart illustrating exemplary processing executed by a print control processing program according to the present exemplary embodiment.

Referring to FIG. 5A, in step S501, the UI processing unit 403 receives a user operation via the web browser screen displayed on the image display apparatus 304. For example, when the user successfully logs into the application server 102 as a result of a user operation via the user command input device 305, the web browser screen 10 (FIG. 1A) is displayed. Accordingly, the user can generate a spreadsheet by utilizing various functions of the spreadsheet application.

In step S502, the web browser 404 communicates with the application server 102 according to the access to the spreadsheet application, which has been executed by the user via the web browser screen 10. In step S503, the popup filter unit 407 executes filtering on the communication by the web browser 404. In step S508, the direct data filtering unit 406 monitors whether the communication is compliant with a condition of each software filter.

More specifically, in step S503, if display instruction data input by a user operation executed by selecting the print button 11 has been detected (Yes in step S503), then the processing advances to step S504. On the other hand, if no display instruction data has been detected (No in step S503), then the processing advances to step S508. Accordingly, the following processing in steps S504 through S507 is executed if the popup filter unit 407 has detected display instruction data.

In step S504, the popup filter unit 407 notifies that the display instruction data has been detected, and an input item on the popup screen to the job control processing unit 401. When the above-described notification is received from the popup filter unit 407, the job control processing unit 401 transmits the notified input item (input item information) to the print setting processing unit 408. In addition, the job control processing unit 401 instructs the display of a print setting screen (pull-printing screen).

In the present exemplary embodiment, similar to the input items on the popup screen 12 (FIG. 1B), the input item includes the paper size and the paper orientation. However, the present exemplary embodiment is not limited to this. In other words, other input items can also be used as the input item.

Figure 6:
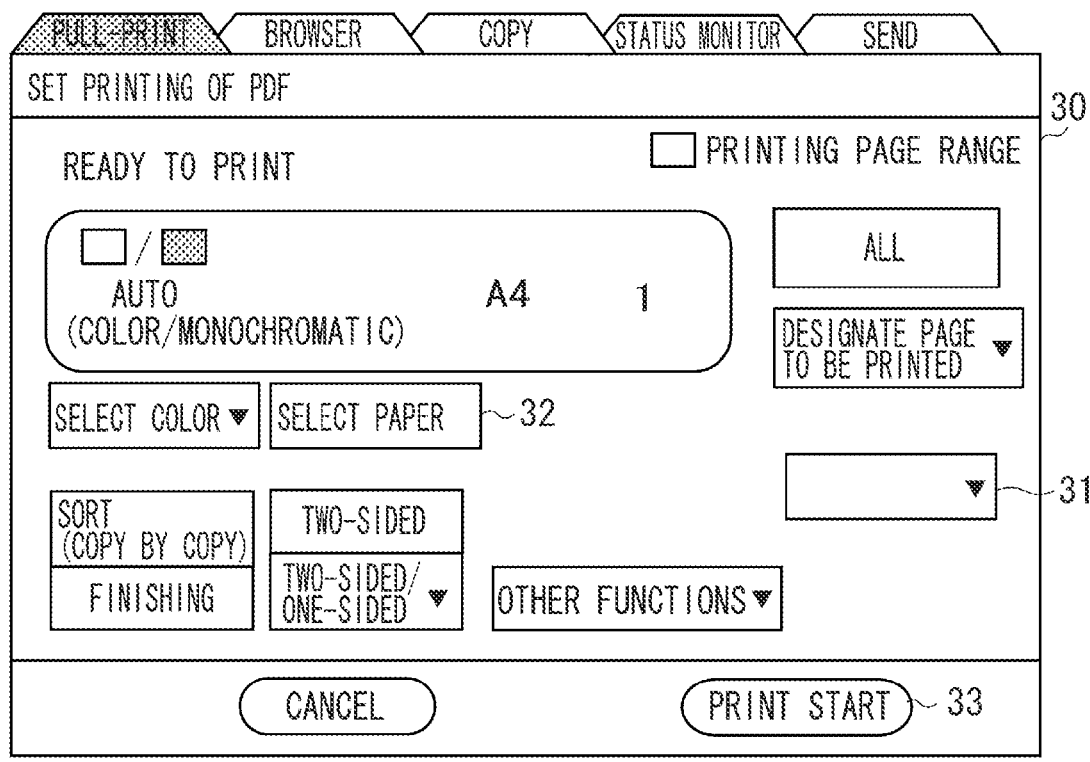
FIG. 6 illustrates an example of a print setting screen.

After receiving the notification for displaying the print setting screen from the job control processing unit 401, the print setting processing unit 408 displays a print setting screen 30 (FIG. 6) on the image display apparatus 304. When the print setting screen 30 is displayed, the print setting screen 30 is superposed on the web browser screen displayed by the web browser 404. Accordingly, for the user the print setting screen 30 seems to be displayed according to an action executed in response to the user operation for selecting the print button 11.

In addition, the input item notified from the job control processing unit 401 is displayed on the print setting screen 30 together. The user can execute an input to a field corresponding to the input item. On the other hand, if no input item has not been notified from the job control processing unit 401, the print setting processing unit 408 displays a print setting screen 20 (FIG. 1D), which is a default print setting screen.

Accordingly, in this case, if the input item is notified from the job control processing unit 401 afterwards, the print setting processing unit 408 can add a paper orientation button 31 to the print setting screen 20 and can use the resulting screen as the print setting screen 30.

On the print setting screen 30, an alternative "auto", which is an alternative for designating the paper size set in an input print job, cannot be selected by pressing a paper selection button 32. To paraphrase this, in this case, the paper size that can be set on the image forming apparatus 101 is to be selected.

For the input item on the popup screen, the button corresponding to the input item can be colored in a color different from the color of the other buttons or can be provided with a specific mark to clearly indicate that the input item is an item to be notified to the application server 102.

In step S505, the user executes a print setting via the print setting screen 30 by executing an operation on the image display apparatus 304. When a print start button 33 is selected, the print setting processing unit 408 notifies print setting information, which includes the content of the print setting, to the job control processing unit 401.

In step S506, the job control processing unit 401 notifies print setting information set to the input item on the popup screen, among the print setting information that has been notified from the print setting processing unit 408 (i.e., the paper size and the paper orientation), to the popup filter unit 407. The popup filter unit 407 inputs the content of the input item notified from the job control processing unit 401 to the corresponding input item on the popup screen, which is currently displayed by background display, to create (simulate) a state in which the print button has been selected. In addition, the web browser 404 notifies the print setting information input via the popup screen to the application server 102.

When the print setting screen input via the popup screen is received, the application server 102 generates a PDF file (PDF data) to be printed based on the received print setting screen. Furthermore, the application server 102 notifies a path to the generated PDF file to the web browser 404 as a reply from the image forming apparatus 101. In this manner, the application server 102 enables the pull-printing of the PDF file.

Furthermore, the web browser 404 issues a GET command for the PDF file to the application server 102 at an appropriate timing. In the present exemplary embodiment, the application server 102 generates a PDF file. However, the application server 102 can generate PDL data or image data of different formats, such as an XPS file or a TIFF file.

As described above, in the present exemplary embodiment, the popup filter unit 407 simulates the input via the popup screen in step S506. However, the present exemplary embodiment is not limited to this. In other words, alternatively, the popup filter unit 407 can generate information of a content similar to the content of the information notified to the application server 102 when the print button is selected via the popup screen and the web browser 404 can notify the generated information to the application server 102.

In step S507, after simulating the input to the popup screen, the popup filter unit 407 sets a print setting flag to the RAM 302. Then the processing returns to step S502 and the processing in step S502 and beyond is executed to monitor the status of the communication executed via the web browser 404.

In step S508, the direct data filtering unit 406 determines whether the web browser 404 has issued a GET command to the application server 102. If it is detected that a GET command has been issued (Yes in step S508), then the direct data filtering unit 406 deletes the GET command. To paraphrase this, in this case, the GET command is not notified to the application server 102.

In addition, the direct data filtering unit 406 notifies the job control processing unit 401 that it has been detected that the GET command has been issued, together with the file path (the URI) included in the GET command. Then the processing advances to step S509. On the other hand, if it is determined that no GET command has been issued (No in step S508), then the processing returns to step S501.

In step S509, the job control processing unit 401 verifies (determines) whether the print setting flag has been set. If it is determined that the print setting flag has been set (Yes in step S509), the job control processing unit 401 determines that the setting via the print setting screen 30 has already been completed. Then the processing advances to step S510. On the other hand, if it is determined that the print setting flag has not been set (No in step S509), then the processing advances to step S513. More specifically, the following processing in steps S510 through S512 is executed if the display instruction data has been detected and if the setting via the print setting screen 30 has been completed.

In step S510, the job control processing unit 401 gives an instruction indicating "no analysis of downloaded file" to the download processing unit 409. In addition, the job control processing unit 401 requests the download processing unit 409 to download the data having the file path included in the GET command to actually download the data.

In step S511, the job control processing unit 401 notifies the downloaded PDF file to the PDL processing unit 413. In addition, the job control processing unit 401 requests the PDL processing unit 413 to execute an analysis and drawing on the PDF file. The PDL processing unit 413 executes drawing on the PDF file in the unit of a page.

In step S512, the job control processing unit 401 notifies the print setting information and each page that has been generated in step S511 to the print processing unit 414 together with the print setting information. Then the notified image data is subjected to appropriate image processing and finishing processing. Then the image-processed data is finally printed by using the print processing unit 414.

After all the pages have been printed, the processing returns to step S501 and the processing executed by using dialogs with the user via the web browser screen is continued.

In the present exemplary embodiment, in executing printing from the web application such as the spreadsheet application installed on the application server 102, in which the popup screen 12 is displayed, the user executes the input via the popup screen 12 of the application server 102 at the same time as executing the input via the print setting screen 30 of the image forming apparatus 101. With the above-described configuration, the present exemplary embodiment can save the user's trouble of having to execute the redundant operation of inputting the instruction via the print setting screen 30 after executing previous inputs via the popup screen 12.

Now, second exemplary processing will be described in detail below with reference to FIGS. 5A and 5B. In the second exemplary processing, the image forming apparatus 101 executes printing by accessing the application server 103 according to a user operation executed via the image display apparatus 304 and executes a file operation by accessing the file server 104.

In the second exemplary processing, in steps S501, the user executes a user operation via the web browser screen displayed on the image display apparatus 304. In step S502, each web server and the web browser 404 executes data communication. In the communication between the application server 103 and the file server 104, a GET command for the directly processable file is issued from the web browser 404 without displaying a popup screen. Accordingly, in this example, because no display instruction data is detected by the popup filter unit 407, a "No" determination result is acquired in step S503.

If a print request to the application server 103 or a file operation request to the file server 104 has been input via the image display apparatus 304, the web browser 404 issues a GET command for the directly processable file. The direct data filtering unit 406 detects that the GET command has been issued and a "Yes" determination result is acquired in step S508. Accordingly, in this case, the processing in step S509 is executed.

In the second processing example, the user does not execute the setting via the popup screen. Therefore, no print setting flag has been set. Accordingly, it is determined "No" in step S509 and the processing advances to step S513.

The following processing in steps S513 through S519 is executed if it is determined in step S509 that no print setting flag has been set. In other words, the processing in step S513 through S519 is executed if pull printing is started when the web application operating on the web browser 404 does not display a popup screen.

More specifically, the processing in step S513 through S519 is executed when a document generated by the document generation application operating on the application server 103 is to be printed. In addition, the processing in step S513 through S519 is executed when a file stored on the file server 104 is to be viewed or printed.

Because information necessary for generating PDF data to be printed has already been acquired by the document generation application on the application server 103 before the printing starts, the user is not required to input a value (additional information) to the input item via the popup screen. In addition, because the file server 104 executes pull printing on an already generated file, it is not necessary for the user to input additional information.

In step S513, the job control processing unit 401 selects processing to be executed when the GET command is detected according to information stored on a table illustrated in FIG. 7. Referring to FIG. 7, an address field 701 stores information about the regular expression of the file path (the URI). The processing type field 702 stores information about the type of processing corresponding to the address 701. To paraphrase this, the table illustrated in FIG. 7 stores information about each of the plurality of web servers and each processing that implements each of the plurality of functions of the image forming apparatus 101, which is mutually associated. The table is previously stored by the user or an administrator of the system on the auxiliary storage device 303. The table can be rewritten or updated where necessary.

In step S513, the job control processing unit 401 serially compares the information about the file path notified from the direct data filtering unit 406 and the information stored in the address field 701 in descending order starting from the information stored in the first (top) field of the address column 701 and searches for a row including information that matches the notified file path.

The job control processing unit 401 selects next processing according to the information stored in the processing type field 702 corresponding to the row including matching information. If it is determined that "selection" is the next processing, then the processing advances to step S514. In step S514, the web browser 404 displays the selection popup screen 14

(FIG. 1C) on the image display apparatus 304 to prompt the user to select a method for processing the directly processable file.

On the other hand, if it is determined that "storage" has been selected via the popup screen on the UI processing unit 403 as the next processing, then the processing advances to step S517. Furthermore, if it is determined that "printing" has been selected via the popup screen on the UI processing unit 403 as the next processing, then the processing advances to step S519. Moreover, if it is determined that "display" has been selected via the popup screen on the UI processing unit 403 as the next processing, then the processing advances to step S515. In addition, if it is determined that "display (preview)" has been selected via the popup screen on the UI processing unit 403 as the next processing or if it is determined in step S514 that "display" has been selected as the next processing, then the processing advances to step S515.

In step S515, the job control processing unit 401 gives an instruction indicating "no analysis of downloaded file" to the download processing unit 409. Furthermore, the job control processing unit 401 requests the download processing unit 409 to download the file having the file path included in the GET command. Then the download processing unit 409 downloads the file.

In step S516, the job control processing unit 401 notifies the downloaded file to the preview processing unit 412 and requests the preview processing unit 412 to execute preview processing. The preview processing unit 412 generates a preview image based on the notified file. Furthermore, the preview processing unit 412 displays the generated preview image on the image display apparatus 304.

If the preview image has been currently executed and if the user executes an operation for discontinuing the preview processing, the preview processing unit 412 ends the preview processing. After the preview processing is completed, the processing returns to step S501 and the processing executed by using dialogs with the user via the web browser screen is continued.

If it is determined that "BOX storage" is the next processing or if it is determined in step S514 that "storage" has been selected, then the processing advances to step S517. In step S517, the job control processing unit 401 gives an instruction indicating "no analysis of downloaded file" to the download processing unit 409. In addition, the job control processing unit 401 requests the download processing unit 409 to download the file having the file path included in the GET command. Then the download processing unit 409 downloads the file.

In step S518, the job control processing unit 401 notifies the downloaded file to the BOX processing unit 410 and requests the BOX processing unit 410 to execute BOX processing on the notified file. The BOX processing unit 410 executes file system registration of the notified file.

After the file system registration has been completed, the processing returns to step S501 and the processing executed by using dialogs with the user via the web browser screen is continued.

On the other hand, if "pull printing" has been determined to be the next processing or if it is determined that "printing" has been selected in step S514 (i.e., according to a print instruction from the job control processing unit 401 or the UI processing unit 403), the processing advances to step S519. In step S519, the job control processing unit 401 executes the pull-printing processing illustrated in FIG. 8. After the pull-printing processing is completed, the processing returns to step S501 and the processing executed by using dialogs with the user via the web browser screen is continued.

Figure 8:
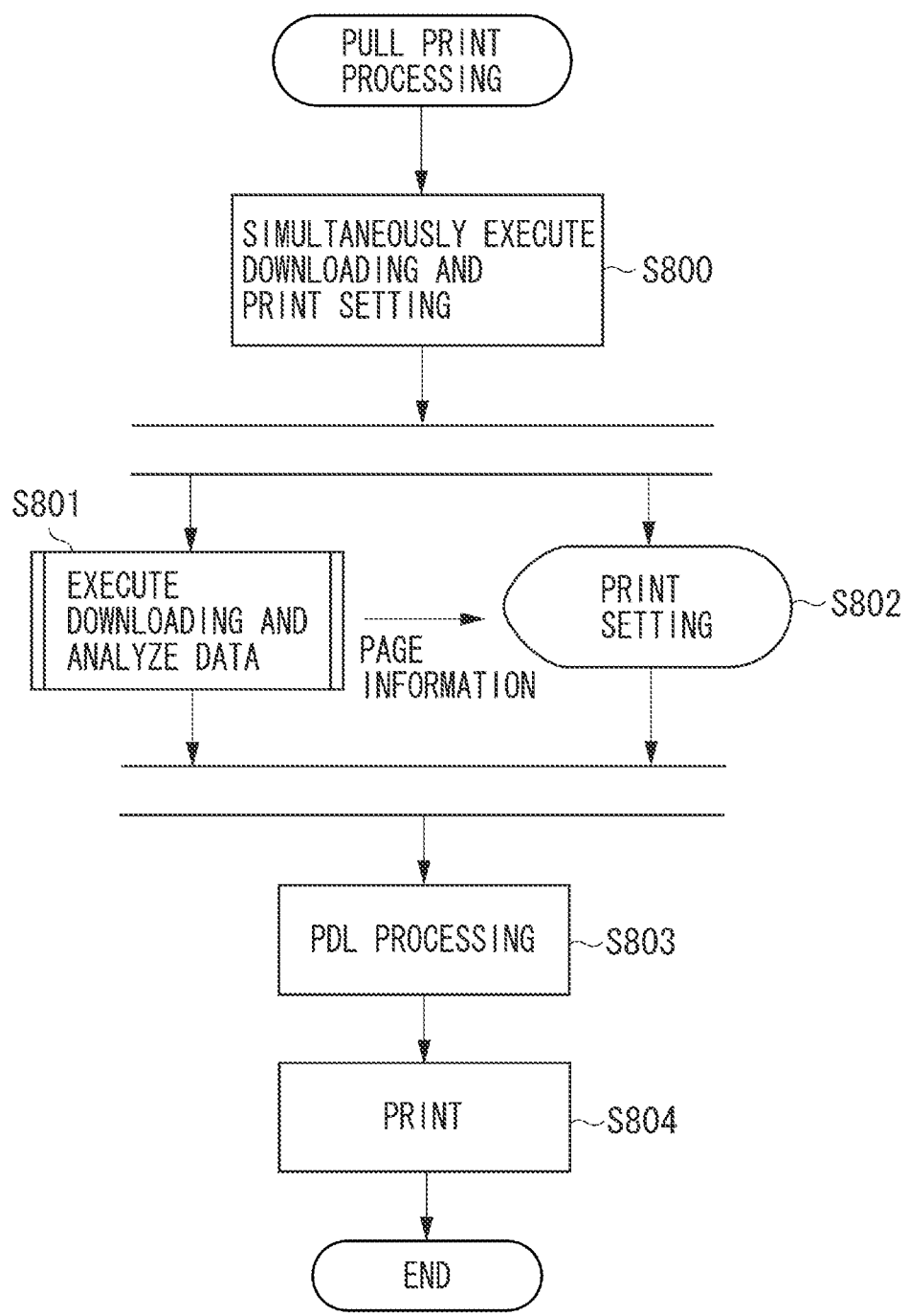
FIG. 8 is a flow chart illustrating exemplary processing executed by a pull-printing processing program.

FIG. 8 is a flow chart illustrating exemplary processing executed by the pull-printing processing program. Referring to FIG. 8, in step S800, the job control processing unit 401 gives an instruction indicating "analysis on downloaded file enabled" to the download processing unit 409. In addition, the job control processing unit 401 requests the download processing unit 409 to download the file (data) having the file path included in the GET command. At substantially the same timing as the timing of issuing the request to the download processing unit 409, the job control processing unit 401 requests the print setting processing unit 408 to display the print setting screen.

In step S801, the download processing unit 409 starts downloading the data, starting from a necessary portion, while analyzing the file according to the type of the file having the file path notified from the job control processing unit 401. In addition, in analyzing the file, the download processing unit 409 acquires the following page quantity information and page information. At each timing of acquiring the page quantity information and the page information, the download processing unit 409 notifies the acquired information to the print setting processing unit 408.

Now, processing executed by the download processing unit 409 for downloading a directly processable file will be described in detail below with reference to FIGS. 9 and 10. In the present exemplary embodiment, PDF data is used as an example of the directly processable file. However, if data of a different type is used, the present exemplary embodiment executes processing unique to the data type.

Figure 9:
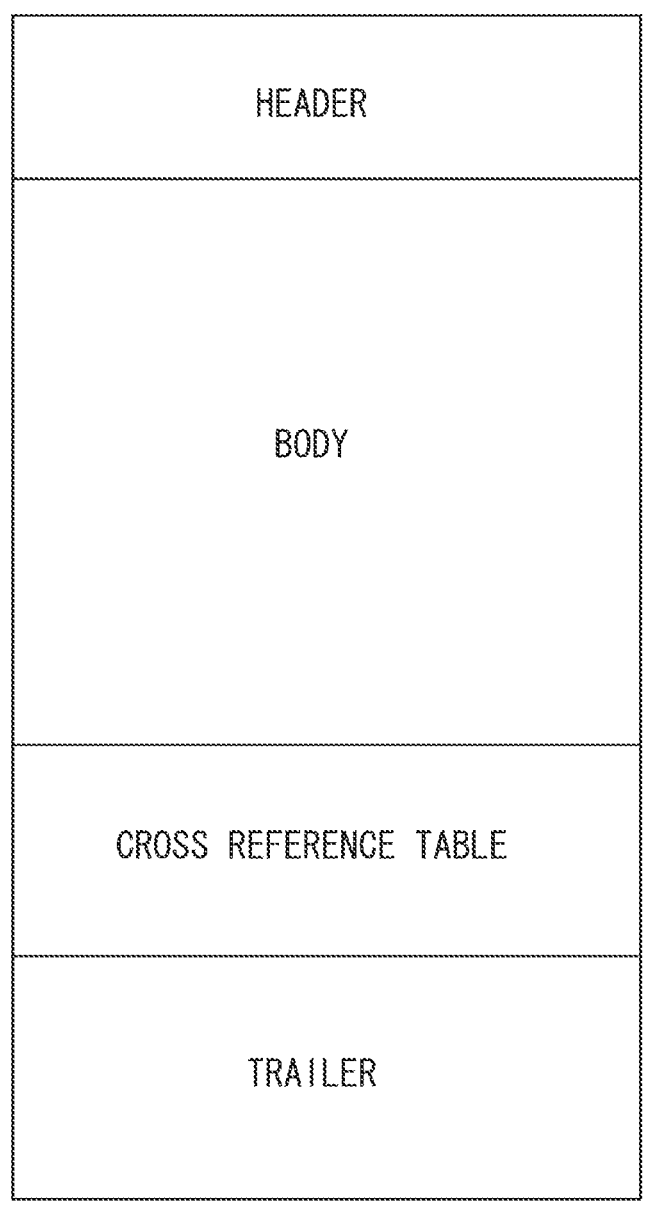
FIG. 9 illustrates an exemplary configuration of a portable document format (PDF) file.

FIG. 9 illustrates an exemplary configuration of a PDF file. A PDF file includes trailer information in a trailing edge portion of the file. The trailer information includes information necessary for analyzing the PDF file, i.e., positional information about the cross reference table included in the file and positional information about a document catalog.

Figure 10:
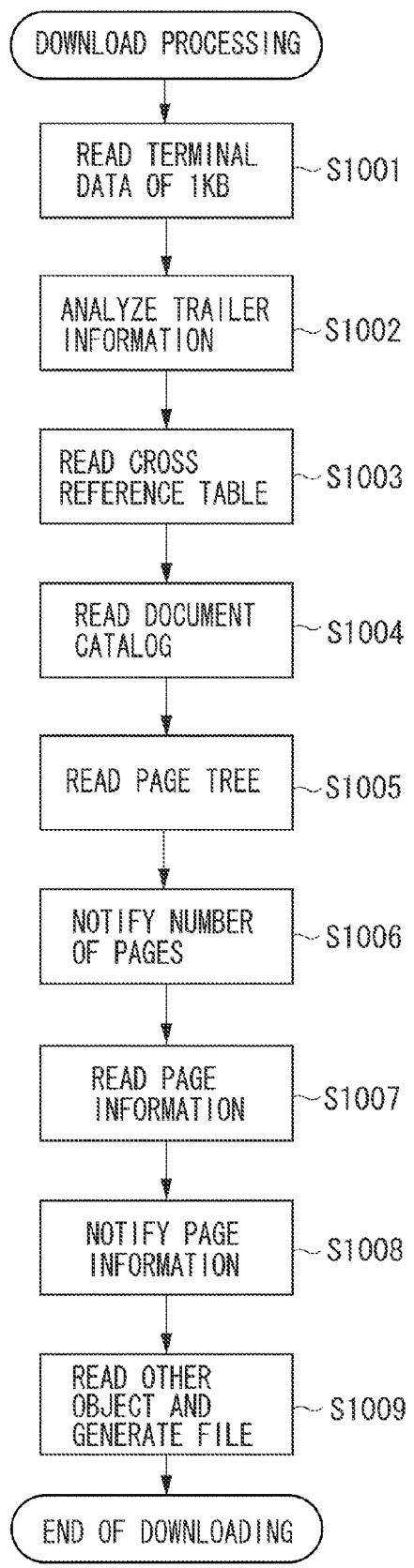
FIG. 10 is a flow chart illustrating exemplary processing executed by a download processing program.

FIG. 10 is a flow chart illustrating exemplary processing executed by a processing program for downloading a PDF file (download processing program), which is executed by the download processing unit 409. Referring to FIG. 10, in step S1001, when a request for downloading a PDF file is input, the download processing unit 409 requests the application server 103 to transmit 1 kilobyte (KB) terminal data of the PDF file.

After receiving the terminal data of 1 KB from the application server 103, the download processing unit 409 stores the received data on the auxiliary storage device 303 as a file. In step S1002, the download processing unit 409 analyzes the trailer information included in the received data. Furthermore, the download processing unit 409 acquires the positional information about the cross reference table and the positional information about the document catalog.

In step S1003, the download processing unit 409 requests the application server 103 to transmit the cross reference table according to each information acquired in step S1002. As a result, the download processing unit 409 receives the requested cross reference table.

The download processing unit 409 stores the received cross reference table on the auxiliary storage device 303 as a file.

In step S1004, the download processing unit 409 requests the application server 103 to transmit the document catalog in the PDF file based on the document catalog positional information and the cross reference table. As a result, the download processing unit 409 receives the document catalog. The download processing unit 409 stores the received document catalog on the auxiliary storage device 303 as a file.

In step S1005, the download processing unit 409 requests the application server 103 to transmit a page tree in the PDF file based on page tree information included in the document catalog and the cross reference table acquired in step S1004. As a result, the download processing unit 409 receives the page tree and stores the received page tree on the auxiliary storage device 303 as a file.

In step S1006, the download processing unit 409 acquires information about the number of pages (page quantity information) in the PDF file from the number of leaf nodes included in the page tree. The download processing unit 409 notifies the acquired page quantity information to the print setting processing unit 408.

In step S1007, the download processing unit 409 requests the application server 103 to transmit each page object in the PDF file based on the page tree and the cross reference table. As a result, the download processing unit 409 receives the page object and stores the received page object on the auxiliary storage device 303 as a file.

In step S1008, the download processing unit 409 acquires the paper size (medium BOX) information from each page object. When the page size information about all pages is completely acquired, the download processing unit 409 notifies the page information including the page size information about all pages to the print setting processing unit 408.

In step S1009, the download processing unit 409 requests the file server 104 to transmit the remaining portion (data) of the PDF file yet to be acquired. As a result, the download processing unit 409 receives the remaining portion (data) of the PDF file. If it is determined that all data of the PDF file has been acquired, the download processing unit 409 combines the acquired pieces of data together in order of the configuration of the PDF file. Furthermore, the download processing unit 409 stores the combined data on the auxiliary storage device 303. Subsequently, the download processing unit 409 notifies the job control processing unit 401 that the downloading processing has been completed.

Figure 11A:
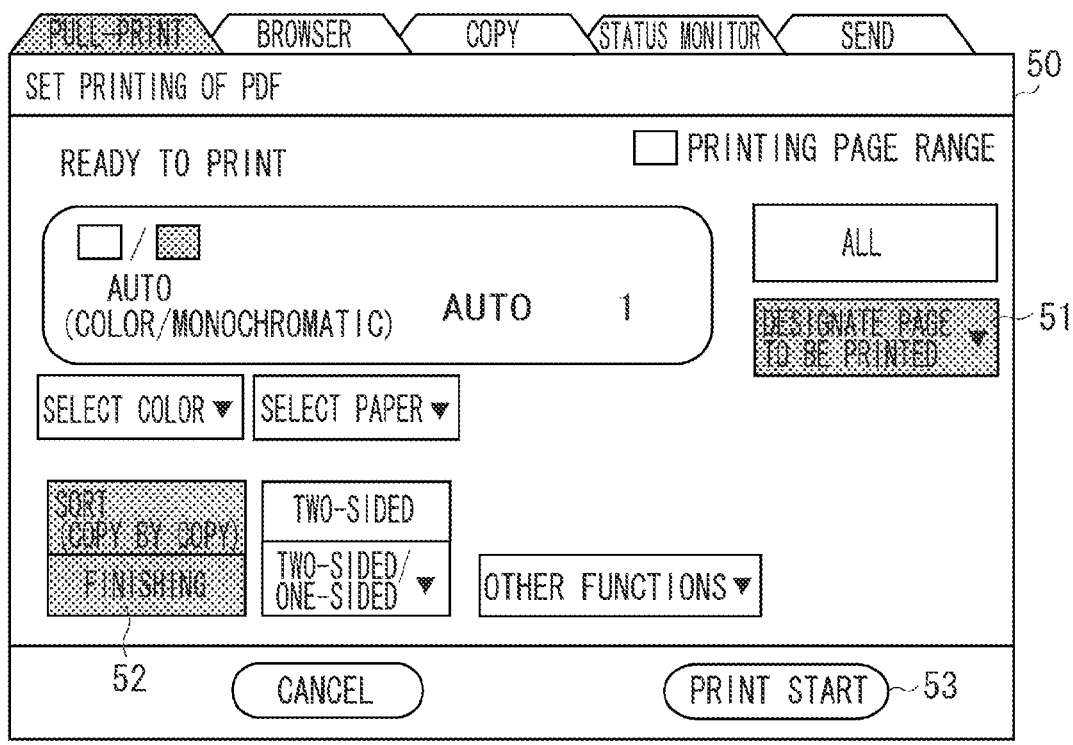
FIGS. 11A through 11C illustrate an example of a print setting screen.

Now, the operation executed by the print setting processing unit 408 in step S802 (FIG. 8) will be described in detail below with reference to FIGS. 11A through 11C. FIG. 11A illustrates an example of a default screen of a print setting screen 50, which is displayed by the image display apparatus 304 when the job control processing unit 401 has input a request for displaying the print setting screen to the print setting processing unit 408.

On the default screen, a page designation button 51 and a finisher button 52 are displayed in a gray-out state to indicate that the user cannot select them. In this state, the user can execute other print settings.

Figure 11B:
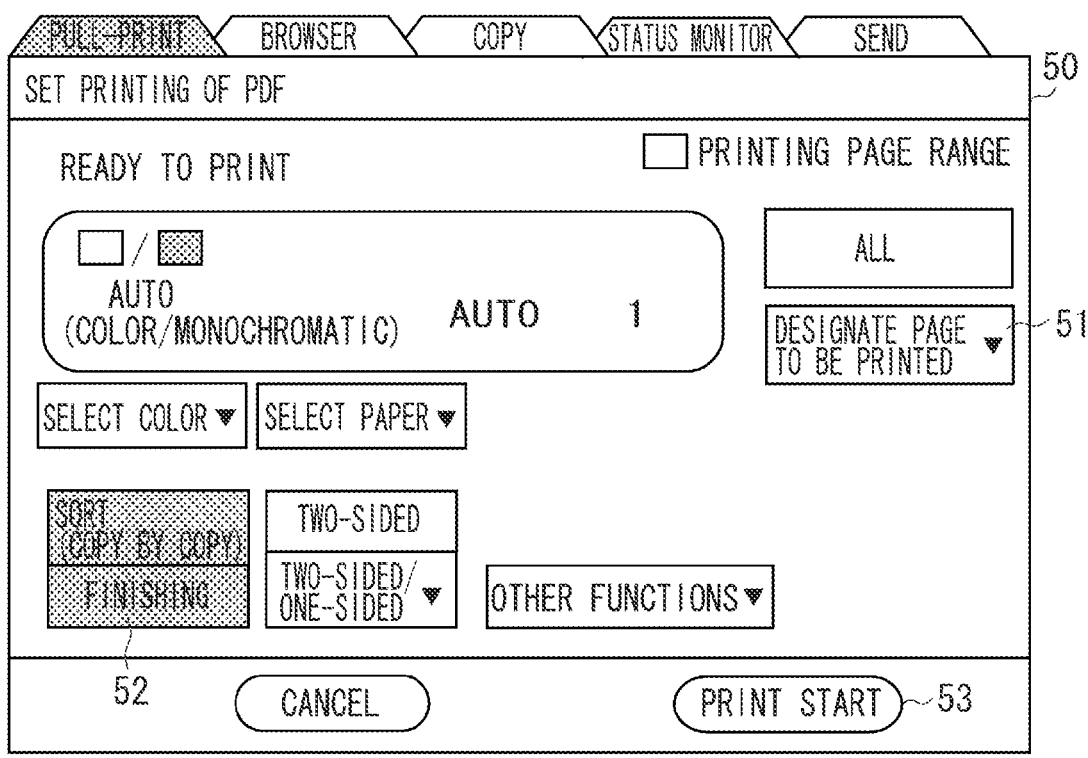

FIG. 11B illustrates an example of a screen displayed by the image display apparatus 304 when the page quantity information is notified from the download processing unit 409 to the print setting processing unit 408. When the page quantity information is notified, the print setting processing unit 408 discontinues the gray-out display of the page designation button 51 because the number of pages included in the print data can be finally determined. Accordingly, in this state, the user can execute an operation for designating the range of pages to be printed.

Figure 11C:
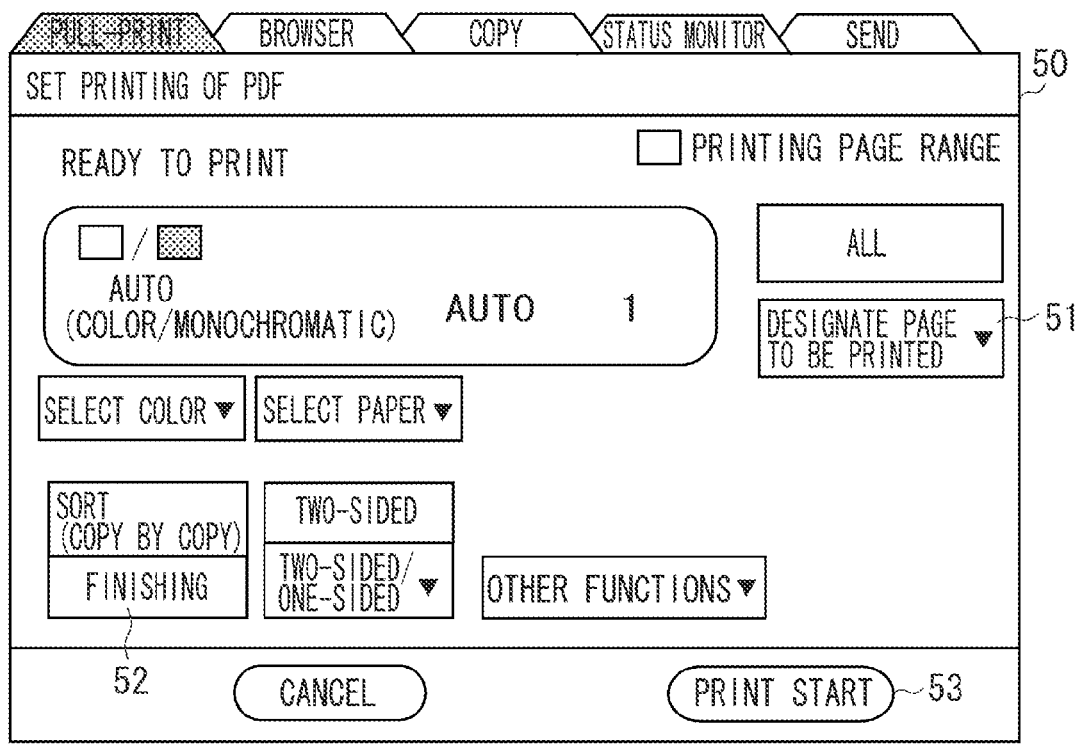

FIG. 11C illustrates an example of a screen displayed by the image display apparatus 304 when the page information is notified from the download processing unit 409 to the print setting processing unit 408. When the page information is received, the print setting processing unit 408 discontinues the gray-out display of the finisher button 52 because whether to set stapling and sorting can be finally determined. Accordingly, in this state, the user can execute an operation for designating the paper discharge method.

For example, in executing stapling, it is required, as a restriction to stapling, that all data included in the print data is of the same series. More specifically, the image forming apparatus 101 cannot output print data that does not satisfy the acquired condition as staple-output target print data.

In each of the screens illustrated in FIGS. 11A through 11C, when a print start button 53 is selected, the print setting processing unit 408 notifies the print setting information to the job control processing unit 401. Then the processing in step S802 (FIG. 8) ends.

When it is notified from each of the download processing unit 409 and the print setting processing unit 408 that the processing in step S801 and step S802 has been completed, the job control processing unit 401 executes the processing in step S803. In step S803, the job control processing unit 401 notifies the downloaded file to the PDL processing unit 413 as the print data and requests the PDL processing unit 413 to execute an analysis and drawing on the print data. The PDL processing unit 413 executes the drawing on the print data in the unit of a page.

In step S804, the job control processing unit 401 notifies each page generated in step S803 and the print setting information to the print processing unit 414. After executing appropriate image processing and finishing on the page data, the print processing unit 414 finally prints the image-processed print data. After printing all the pages, the processing returns to step S501 and the processing executed by using dialogs with the user via the web browser screen is continued.

According to the present exemplary embodiment, in executing pull printing of a directly processable file, the processing for downloading print data is executed while the print setting processing is currently executed. Therefore, the present exemplary embodiment can effectively reduce the time required for the user to wait until the print data is completely downloaded. Accordingly, the present exemplary embodiment can provide the highly productive image forming apparatus 101.

In addition, according to the present exemplary embodiment, the information necessary for the print setting processing, which is included in the print data, is displayed on the print setting screen while downloading the print data. Therefore, the user can start a designation from items that can be set. Accordingly, the present exemplary embodiment can further improve the productivity of the image forming apparatus 101.

Furthermore, when a directly processable file is acquired, the present exemplary embodiment enables the user to set a desired default processing method differently for each file path (URI). Therefore, the number of operations (steps) the user is required to select for the processing method can be reduced. Accordingly, the present exemplary embodiment can yet further improve the productivity of the image forming apparatus 101.

In the present exemplary embodiment, each print method is implemented by one image forming apparatus for easier understanding. However, the embodiments are not limited to this. More specifically, the embodiments can be implemented by an appropriate combination of the described configurations.

The embodiments can also be achieved by providing a system or an apparatus with a storage medium storing software (program) implementing the functions of the embodiments or via a network and by reading and executing the program code stored in the storage medium with a computer of the system or the apparatus (a CPU or a micro processing unit (MPU)). In an example, a computer-readable medium may store a program that causes an image forming apparatus to perform a method described herein. In another example, a central processing unit (CPU) may be configured to control at least one unit utilized in a method or apparatus described herein.

With the above-described configuration, the present exemplary embodiment can further improve the productivity of the image forming apparatus that processes and handles print data stored on the information processing apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-145117 filed Jun. 25, 2010, which is hereby incorporated by reference herein in its entirety.

What is claimed is:

1. An image forming apparatus comprising:
   an acquisition unit configured to acquire print data from an information processing apparatus;
   a setting unit configured to receive a user operation executed via an input device and configured to execute a print setting for the print data, wherein the print setting is configured to be in a disabled state that prevents the user from performing an operation of the print setting and an enabled state that permits the user to perform an operation of the print setting; and
   an instruction unit configured to instruct the acquisition unit to acquire the print data based on a print instruction for executing printing and configured to instruct the setting unit to receive an input by the user operation for executing the print setting for the print data,
   wherein the print setting is an operation for designating a range of pages to be printed and is in a disabled state that prevents the user from designating a range of pages to be printed from the print data,
   wherein the acquisition unit is configured to receive, from the information processing apparatus according to an instruction input by the instruction unit, first information that is part of the print data from which the acquisition unit can acquire second information that is different from the first information, wherein the second information is page quantity information representing a number of pages of the print data, and
   wherein the setting unit is configured to receive the user operation according to an instruction input by the instruction unit and to change, in response to the acquisition unit notifying the page quantity information to the setting unit, the print setting from being in the disabled state to being in an enable state such that the user can designate a range of pages to be printed from the print data.

2. The image forming apparatus according to claim 1,
   wherein the print setting is an operation for designating a paper discharge method and is in a disabled state that prevents the user from designating a paper discharge method for the print data,
   wherein the acquisition unit is configured acquire, from the information processing apparatus according an instruction input by the instruction unit, paper size information that is part of the print data and represents a size of paper for use in printing the print data, and
   wherein the setting unit is configured to receive the user operation according to an instruction input by the instruction unit and to change, in response to the acquisition unit notifying the paper size information to the setting unit, the print setting from being in the disabled state to being in an enable state such that the user can designate a paper discharge method for the print data.

3. A print control method for an image forming apparatus, the print control method comprising:
   acquiring print data from an information processing apparatus;
   receiving a user operation executed via an input device and executing a print setting for the print data, wherein the print setting is configured to be in a disabled state that prevents the user from performing an operation of the print setting and an enabled state that permits the user to perform an operation of the print setting; and
   instructing the acquiring to acquire the print data based on a print instruction for executing printing and instructing the receiving to receive an input by the user operation for executing the print setting for the print data,
   wherein the print setting is an operation for designating a range of pages to be printed and is in a disabled state that prevents the user from designating a range of pages to be printed from the print data,
   wherein acquiring includes receiving, from the information processing apparatus according to an input instruction, first information that is part of the print data from which the acquiring can acquire second information that is different from the first information, wherein the second information is page quantity information representing a number of pages of the print data, and
   wherein receiving includes receiving the user operation according to an input instruction and changing, in response to the acquiring notifying the page quantity information, the print setting from being in the disabled state to being in an enable state such that the user can designate a range of pages to be printed from the print data.

4. A non-transitory computer-readable storage medium storing a program that causes an image forming apparatus to perform the print control method according to claim 3.

* * * * *